US008137425B2

(12) United States Patent
Saito et al.

(10) Patent No.: US 8,137,425 B2
(45) Date of Patent: Mar. 20, 2012

(54) INTAKE SYSTEM FOR VEHICLE INTERNAL COMBUSTION ENGINE (75) Inventors: Haruhiko Saito, Toyota (JP); Tatsuya Oyama, Takahama (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 315 days.

(21) Appl. No.: 12/524,621

(22) PCT Filed: Jan. 29, 2008

(86) PCT No.: PCT/IB2008/000191
§ 371 (c)(1),
(2), (4) Date: Jul. 27, 2009

(87) PCT Pub. No.: WO2008/093207
PCT Pub. Date: Aug. 7, 2008

(65) Prior Publication Data
US 2010/0083928 A1    Apr. 8, 2010

(30) Foreign Application Priority Data

Jan. 29, 2007 (JP) ................................. 2007-017698

(51) Int. Cl.
*B01D 46/00* (2006.01)
(52) U.S. Cl. ......... 55/385.3; 55/419; 55/420; 123/198 E
(58) Field of Classification Search ................. 55/385.3, 55/419, 420, 306, 497, 500; 96/399, 407; 123/198 E, 184.53, 184.56
See application file for complete search history.

(56) References Cited

U.S. PATENT DOCUMENTS

| 4,274,368 | A | * | 6/1981 | Shaffer | 123/184.47 |
| 4,858,567 | A | * | 8/1989 | Knapp | 123/184.56 |
| 4,862,840 | A | * | 9/1989 | Matsunaga et al. | 123/184.55 |
| 4,911,111 | A | * | 3/1990 | Matsunaga | 123/184.55 |
| 5,174,258 | A | * | 12/1992 | Tanaka | 123/198 E |
| 5,526,777 | A | * | 6/1996 | Taomo et al. | 123/41.65 |
| 6,209,503 | B1 | | 4/2001 | Komada et al. | |
| 6,382,161 | B1 | | 5/2002 | Alex et al. | |
| 6,423,108 | B1 | | 7/2002 | Mueller | |

FOREIGN PATENT DOCUMENTS

| GB | 2 318 829 A | 5/1998 |
| JP | 38-9002 U | 5/1963 |
| JP | 06-047659 U | 6/1994 |
| JP | 10-339225 A | 12/1998 |
| JP | 2000-110681 A | 4/2000 |
| JP | 2000-303925 A | 10/2000 |
| JP | 2002-506951 A | 3/2002 |
| JP | 2002-507693 A | 3/2002 |
| JP | 2002-195116 A | 7/2002 |

* cited by examiner

*Primary Examiner* — Duane Smith
*Assistant Examiner* — Minh-Chau Pham
(74) *Attorney, Agent, or Firm* — Sughrue Mion, PLLC (57) ABSTRACT

An intake system (10, 20) for a vehicle internal combustion engine is provided in which a first air intake duct (16), having an air intake inlet (16*a*) to inhale external air, is connected to an air cleaner box (14). A second air intake duct (17, 27) is also connected to the air cleaner box. The air intake inlet is closer to the air cleaner box than the second air intake duct is. The cross section area of a second air intake duct is greater than the cross section area of the first air intake duct. The center axis of the second air intake duct at an end on the side of a second air intake opening (12, 22) intersects with the center axis of the first air intake duct at an end on the side of a first air intake opening (11).

13 Claims, 9 Drawing Sheets

INTAKE SYSTEM FOR VEHICLE INTERNAL COMBUSTION ENGINE

BACKGROUND OF THE INVENTION

1. Field of the Invention

The present invention relates to an intake system for a vehicle internal combustion engine that has multiple air intake ducts.

2. Description of the Related Art

Generally, in an intake system for a vehicle internal combustion engine (hereinafter, simply referred to as "engine") that is mounted on a vehicle such as an automobile, air inhaled through an air intake duct is filtered by an air cleaner element in an air cleaner box and is supplied to an intake port of the engine. Further, multiple ducts may be provided to compensate for the lack of inhaled air when the engine operates at a high-speed high-load region.

Japanese Patent Application Publication No. 2002-195116 (JP-A-2002-195116) describes an intake system for the vehicle internal combustion engine in which a bifurcated air intake duct is connected to an air cleaner housing. When the engine operates at a low-speed low-load region, air is inhaled through only one of the openings of the intake duct. When the engine operates at a high-speed high-load region, air is inhaled through both the openings of the intake duct.

Further, Japanese Patent Application Publication No. 2000-303925 (JP-A-2000-303925) describes an intake system for the vehicle internal combustion engine that has two air intake ducts having resonant frequencies different from each other. One of the two intake ducts opens in a cowl box and the other opens to a fender. A desirable air intake sound is generated by inhaling air through these two air intake ducts when the engine operates at a high-speed high-load region, thereby realizing a powerful sporty sound.

However, the intake system for the vehicle internal combustion engine described in the above JP-A-2002-195116 or JP-A-2000-303925 has a limitation to increase the number of intake ducts or enlarge the cross-section area of the air intake ducts in a small or narrow engine compartment. Further, due to the pressure loss occurring when air is inhaled through the intake ducts, the intake air becomes insufficient when the engine operates at a high-speed high-load region. Thus, good engine performance is not achieved. When air is inhaled directly through the air intake opening of the air cleaner housing to avoid such a pressure loss caused by the intake duct, because the air warmed up in the engine compartment is inhaled, the thermal efficiency is decreased, and good engine performance is still not achieved.

SUMMARY OF THE INVENTION

The present invention provides an intake system for a vehicle internal combustion engine that inhales sufficient amount of air even if the engine operates at a high-speed high-load region, and that inhales more air whose temperature is lower than that of the air in the engine compartment, as compared with a conventional intake system. Thus, the intake system of the present invention achieves good engine performance when the engine operates at a high-speed high-load region.

An aspect of the present invention provides an intake system for a vehicle internal combustion engine that includes an air cleaner box having a first air intake opening, second air intake opening and a communication opening that communicates with an intake port of the vehicle internal combustion engine, and a first air intake duct that has an air intake inlet. The first air intake duct is connected to the air cleaner box such that air is inhaled from the air intake inlet into the air cleaner box through the first air intake opening. The intake system further includes a second air intake duct that is connected to the air cleaner box such that air is inhaled into the air cleaner box through the second air intake opening. The air intake inlet is farther apart from the air cleaner box than the second air intake duct is. An on-off valve is provided in the second air intake duct such that the air is inhaled into the air cleaner box through the first air intake opening when the on-off valve is closed, and air is inhaled into the air cleaner box from both of the first air intake opening and the second air intake opening when the on-off valve is opened. The cross section area of the second air intake duct is greater than the cross section area of the first air intake duct. The first air intake duct and the second air intake duct are disposed such that a center axis of the second air intake duct at an end portion on a side of the second air intake opening intersects with a center axis of the first air intake duct at an end portion on a side of the first air intake opening.

According to this aspect of the invention, when the engine operates at a high-speed high-load region, the on-off valve is opened to inhale a sufficient amount of air from the second air intake opening, and the streamline of the air inhaled from the second air intake opening intersects with the streamline of the air inhaled from the first air intake opening in the air cleaner box. Therefore, the flow of the lower temperature air inhaled from the inlet to inhale external air that is located apart from the air cleaner box in a front side of the vehicle is facilitated by the flow of the air inhaled from the second air intake opening. Accordingly, even if the engine operates at a high-speed high-load region, a sufficient amount of air is inhaled from the second air intake opening, and a greater amount of low temperature air is inhaled from the first air intake opening, as compared with a conventional intake system. Thus, good engine performance can be achieved when the engine operates at a high-speed high-load region.

The distance from the center of the first air intake opening to the center of the second air intake opening may be smaller than the distance from the center of the first air intake opening to the center of the communication opening, and the distance from the center of the second air intake opening to the center of the communication opening.

According to this construction, in the air cleaner box, the airflow from the second air intake opening to the communication opening passes near the first air intake opening. Thus, air is drawn from the first air intake opening into the air cleaner box by the airflow from the second air intake opening to the communication opening. Accordingly, the airflow inhaled from the first air intake opening into the air cleaner box is facilitated more effectively by the airflow inhaled from the second air intake opening to the communication opening, and good engine performance can be obtained, when the engine operates at a high-speed high-load region.

The first air intake duct and the second air intake duct may be disposed such that the center axis of the second air intake duct at the end portion on the side of the second air intake opening is substantially orthogonal to the center axis of the first air intake duct at the end portion on the side of the first air intake opening.

According to this construction, the first air intake opening and the second air intake opening may be formed respectively in the inner wall surfaces of the air cleaner box that are adjacent to each other. Therefore, the opening area or size of the second air intake opening is set to a desirable size without any limitation or restriction on layout. Accordingly, when the engine operates at a high-speed high-load region, a sufficient amount of air is inhaled from the second air intake opening, and good engine performance is obtained.

Further, the second air intake opening may be formed in a wall surface of the air cleaner box that faces the communication opening.

According to this construction, the air inhaled into the air cleaner box from the second air intake opening is inhaled into the communication opening without greatly changing the flow direction thereof. Accordingly, pressure loss of the air inhaled into the communication opening from the second air intake opening is prevented from occurring, and a sufficient amount of air is inhaled from the second air intake opening. Thus, good engine performance can be achieved when the engine operates at a high-speed high-load region.

The communication opening may be formed closer to a wall surface of the air cleaner box in which the first air intake opening is formed than to a wall surface of the air cleaner box facing the first air intake opening.

According to this construction, the air inhaled into the air cleaner box from the second air intake opening flows harder or faster on the side of the wall surface of the air cleaner box in which the first air intake opening is formed than on the side of the wall surface of the air cleaner box that faces the first air intake opening. Accordingly, the air is securely drawn into the air cleaner box from the first air intake opening and its flow is facilitated, good engine performance can be achieved when the engine operates at a high-speed high-load region.

The second air intake opening may be formed closer to a wall surface of the air cleaner box in which the first air intake opening is formed than to a wall surface of the air cleaner box facing the first air intake opening.

According to this construction, the air inhaled into the air cleaner box from the second air intake opening flows harder or faster on the side of the wall surface of the air cleaner box in which the first air intake opening is formed than on the side of the wall surface of the air cleaner box that faces the first air intake opening. Accordingly, the air is securely drawn into the air cleaner box from the first air intake opening and its flow is facilitated, good engine performance can be achieved when the engine operates at a high-speed high-load region.

The second air intake opening may include a wide width portion and a narrow width portion whose opening widths are different from each other, and the wide width portion is closer to the first air intake opening than the narrow width portion is.

According to this construction, the flow rate and the flow volume of the air passing through the wide width portion of the second air intake opening are higher than the flow rate and the flow volume of the air passing through the narrow width portion. Accordingly, air is further securely drawn into the interior of the air cleaner box 14 from the first air intake opening, and the airflow thereof is facilitated. Thus, good engine performance can be achieved, when the engine operates at a high-speed high-road region.

The length of a sidewall of the second air intake duct from an open end thereof to the second air intake opening on a side near the first air intake opening 11 may be shorter than a length of the sidewall of the second air intake duct from the open end to the second air intake opening on a side apart from the first air intake opening.

According to this construction, because the length of the sidewall of the second air intake duct from the open end to the second air intake opening on the side near the first air intake opening is shorter than the length of the sidewall of the second air intake duct from the open end to the second air intake opening on the side apart from the first air intake opening, the pressure loss in the second air intake duct on the side near the first air intake opening is smaller than that on the side apart from the first air intake opening. Therefore, the flow rate and the flow volume of the air flowing in the second air intake duct on the side near the first air intake opening are higher than those on the side apart from the first air intake opening. Accordingly, air is securely drawn into the interior of the air cleaner box from the first air intake opening, and the airflow thereof is facilitated. Thus, good engine performance can be achieved, when the engine operates at a high-speed high-road region.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Embodiments of the present invention will be described with reference to the drawings below.

Figure 1:
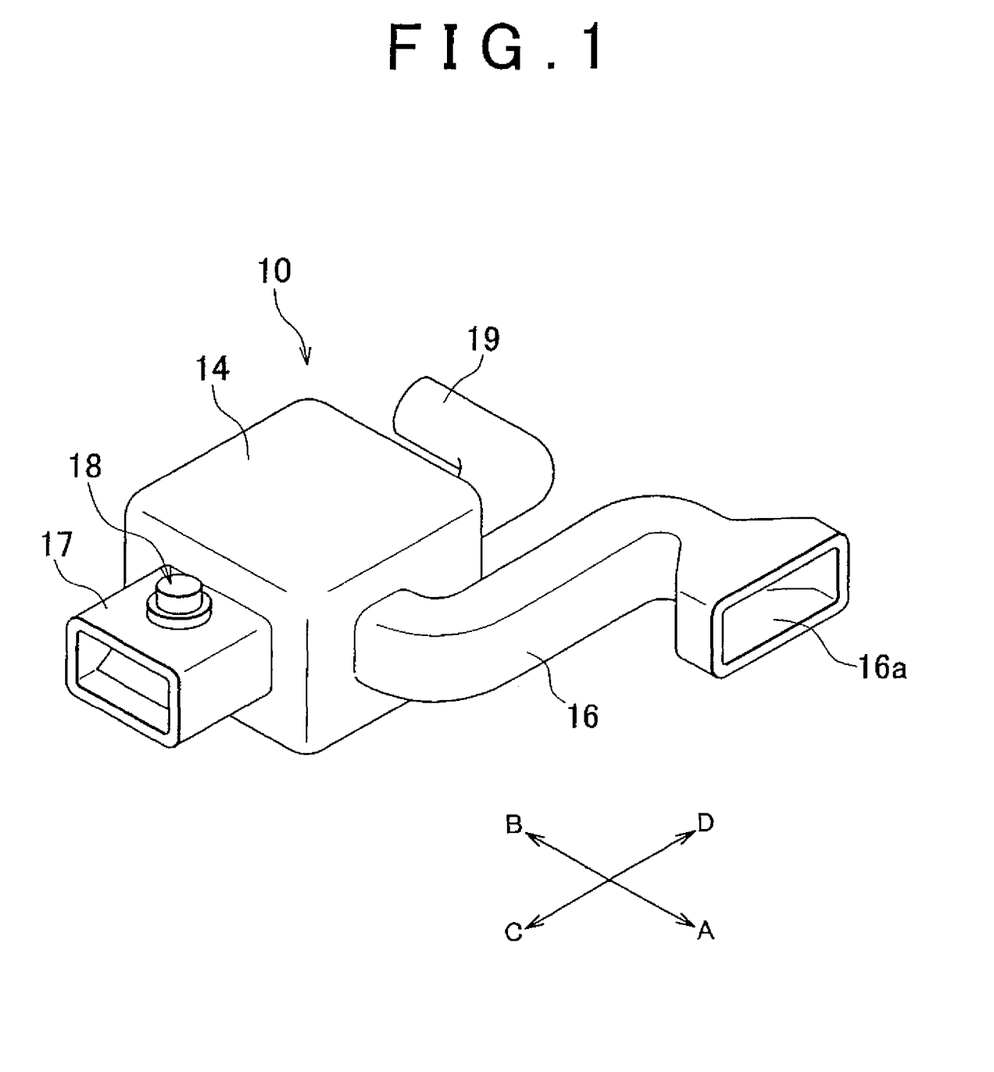
FIG. 1 is a perspective view illustrating a schematic construction of an intake system for a vehicle internal combustion engine according to a first embodiment of the present invention.

FIG. 1 to FIG. 4 show an intake system for a vehicle internal combustion engine according to a first embodiment of the present invention. An intake system 10 for the vehicle internal combustion engine according to the first embodiment is provided with, as shown in FIG. 1, FIG. 2A and FIG. 2B, an air cleaner box 14 having a first air intake opening 11, a second air intake opening 12 and a communication opening 13 that communicates with an unshown intake port of the engine. The air cleaner box 14 is made of a resin material and formed by injection molding. In this embodiment, the air cleaner box 14 is formed in a generally rectangular parallelepiped shape.

A filter element 15 is provided in the cleaner box 14 so as to be interposed between the communication opening 13 and the two air intake openings (i.e. first air intake opening 11 and the second air intake opening 12). The filter element is a known filtering medium that filters air inhaled through the first air intake opening 11 and the second air intake opening 12.

Figure 4:
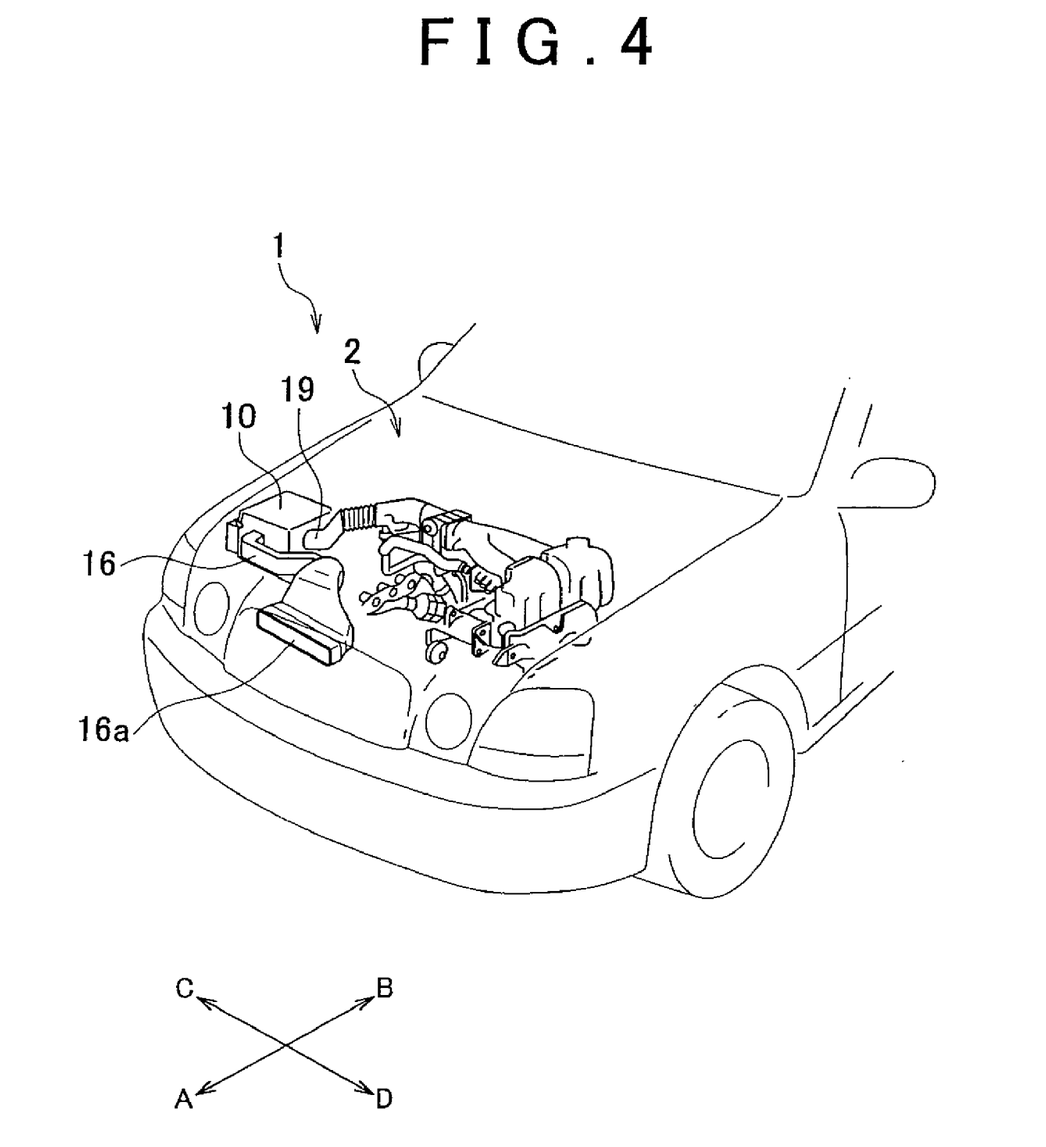
FIG. 4 is a perspective view illustrating a state of the intake system for the vehicle internal combustion engine according to the first embodiment of the present invention mounted on a vehicle.

As shown in FIG. 1, a first intake duct 16 is connected to the front side of the air cleaner box 14 such that air is inhaled into the air cleaner box 14 through the first air intake opening 11. As shown in FIG. 4, the first intake duct 16 has an air intake inlet 16*a* that is located farther apart from the air cleaner box 14 than an open end of a second intake duct 17 is, to inhale exterior or outside air, which is low temperature air immediately after entering the engine compartment from the outside of the vehicle 1. For example, the air intake inlet 16*a* is located on the front side of the second air intake duct 17 in a longitudinal direction of the vehicle 1 (direction of arrow A), and in the front portion of the engine compartment 2 above a radiator. The air intake inlet 16*a* inhales air in the direction of arrow B.

Further, the second air intake duct 17 is connected to the air cleaner box 14. The second air intake duct 17 inhales air from its open end into the air cleaner box 14 through the second air intake opening 12. The second air intake duct 17 opens toward the right side (direction of arrow C in FIG. 4) of the vehicle 1 near a fender in the engine compartment 2. The second air intake duct 17 inhales air in the engine compartment 2 in the direction of arrow D (See FIG. 3A).

An intake pipe 19 is connected to the communication opening 13 of the air cleaner box 14 so as to supply air from the air cleaner box 14 to the engine through the communication opening 13. Air flowing out from the air cleaner box 14 passes through the intake pipe 19 and is supplied to the engine via an airflow meter, a throttle body and an intake manifold, which are not shown in the drawing. The above-described first air intake duct 16, the second air intake duct 17 and the intake pipe 19 are made of resin material, as the air cleaner box 14 is.

Figure 2A:
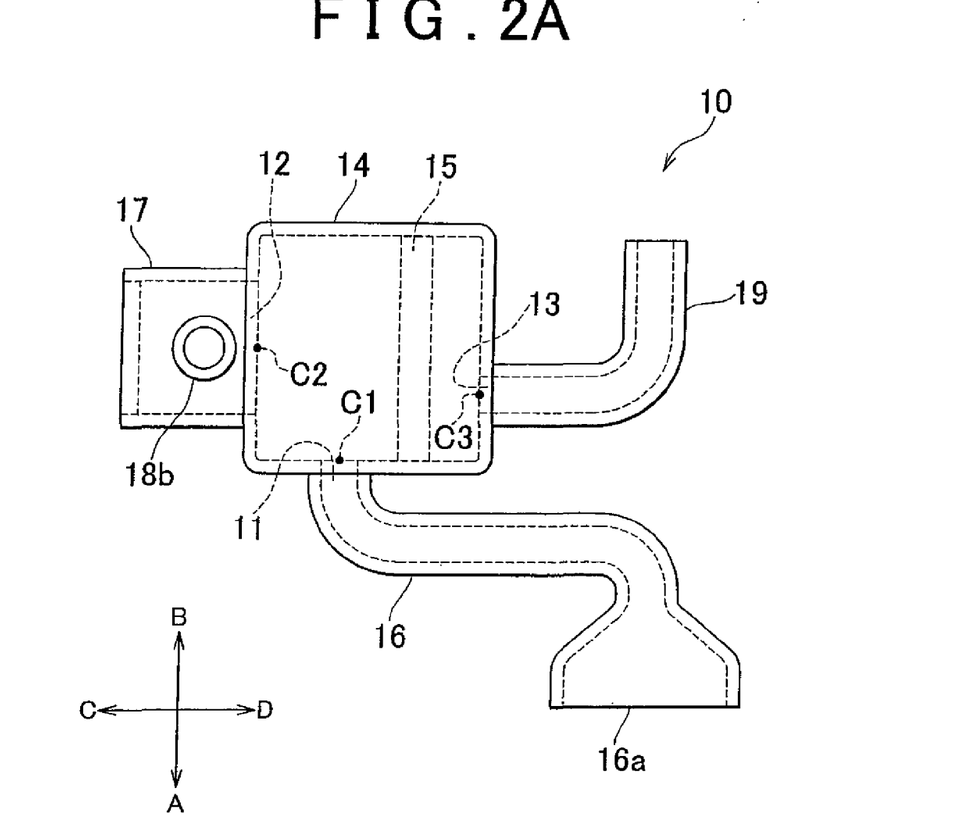
FIGS. 2A and 2B are a top view and a side elevation, respectively, of the intake system for the vehicle internal combustion engine according to the first embodiment of the present invention.
Figure 2B:
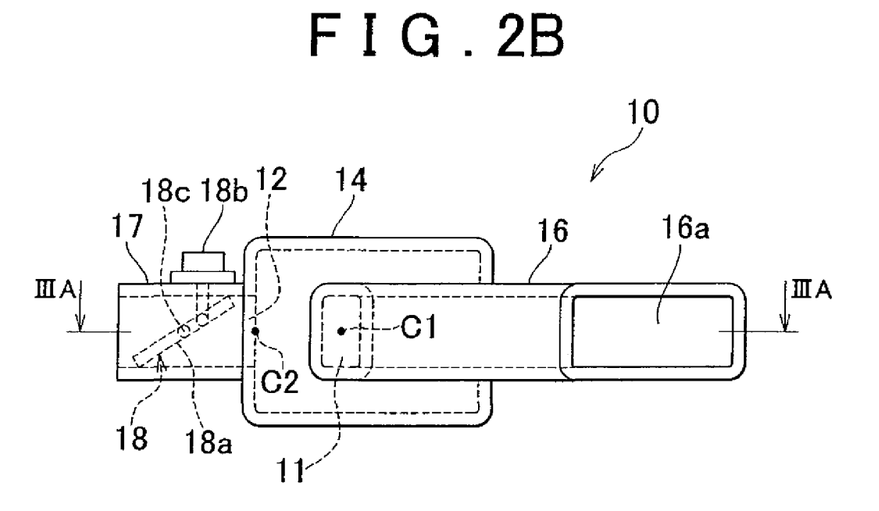
Figure 3A:
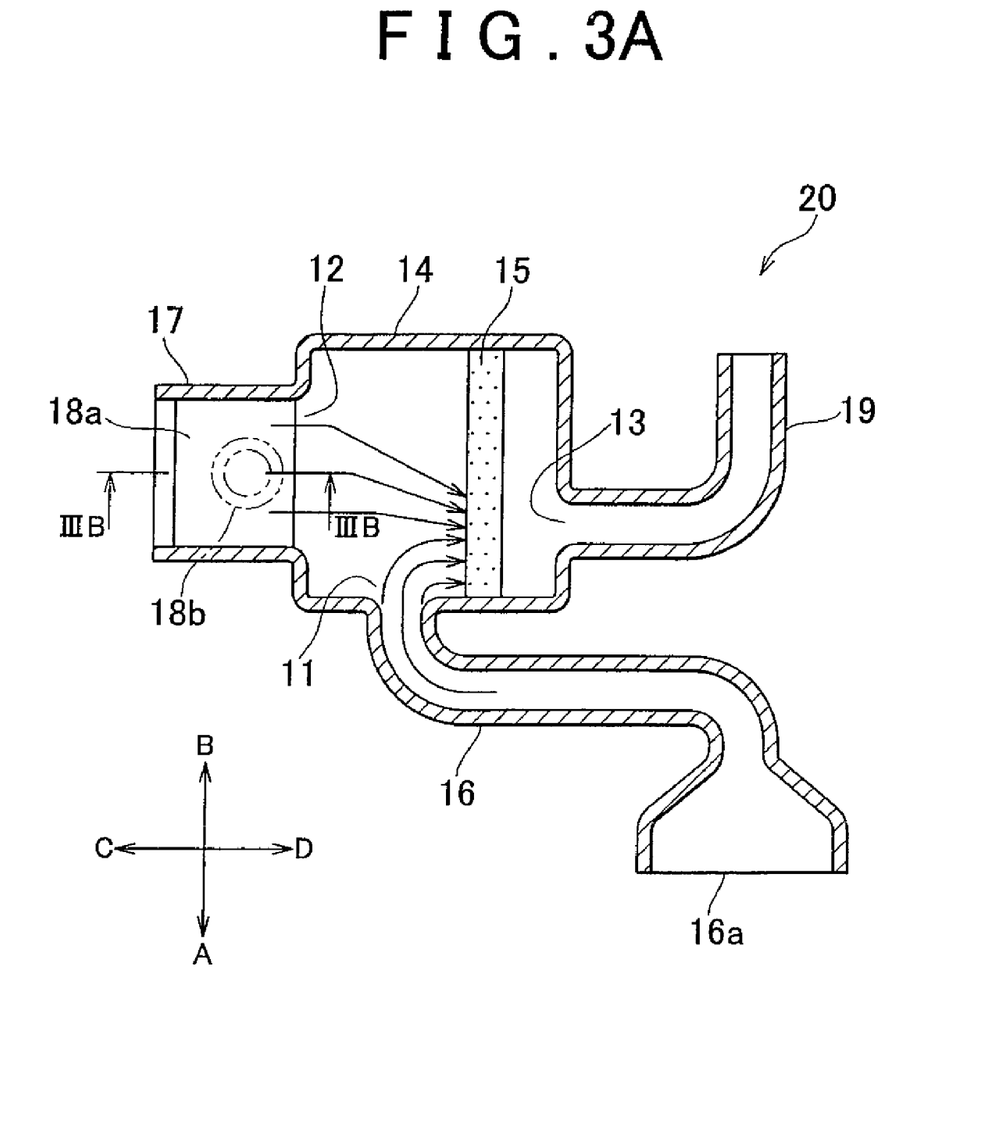
FIG. 3A is a cross section taken along IIIA-IIIA of FIG. 2B, illustrating an internal construction of the intake system for the vehicle internal combustion engine according to the first embodiment of the present invention.
Figure 3B:
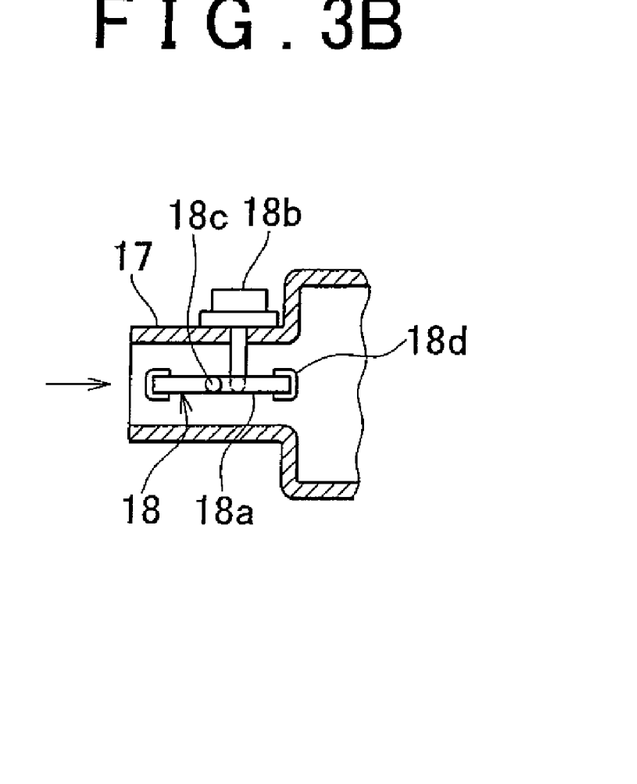
FIG. 3B is a cross section taken along IIIB-IIIB of FIG. 3A, illustrating a construction of an on-off valve provided in the second air intake duct according to the first embodiment.
Figure 3C:
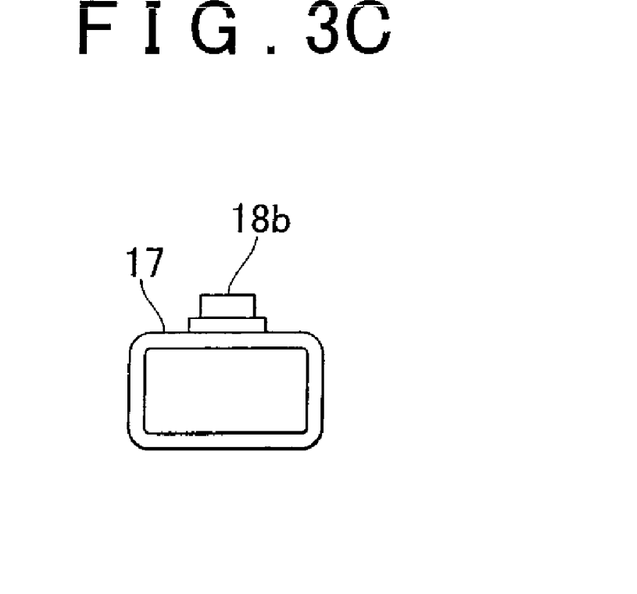
FIG. 3C is a side elevation showing a shape of an air intake inlet of the second air intake duct according to the first embodiment.

An on-off valve 18*a* that opens and closes the second air intake duct 17 is provided in the second air intake duct 17 so as to be rotatable about the rotation shaft 18*c* as a fulcrum. Further, a negative pressure actuator 18*b* is provided in the second air intake duct 17. The negative pressure actuator 18*b* opens and closes the on-off valve 18*a* in accordance with the negative pressure in the second air intake duct 17. The on-off valve 18*a*, the negative pressure actuator 18*b* and the rotation shaft 18*c* constitute an on-off valve unit 18. In addition, a seal member 18*d* (see FIG. 3B) is provided around the periphery of the on-off valve 18*a* to avoid an occurrence of a gap between the on-off valve 18*a* and the second air intake duct 17 when the on-off valve 18*a* is closed. More specifically, the negative pressure actuator 18*b* maintains a state in which the on-off valve 18*a* is closed (as shown in FIG. 2B), when the negative pressure in the second air intake duct 17 is equal to or higher than a threshold value, i.e., the pressure in the second air intake duct 17 is equal to or lower than a threshold value. The negative pressure actuator 18*b* opens the on-off valve 18*a* as shown in FIG. 3B, when the engine operates at a high-speed high-load region and the negative pressure in the second air intake duct 17 is below the threshold. The threshold to open or close the on-off valve 18*a* may be the negative pressure generated in the second air intake duct 17 when the engine speed is 3600-4000 rpm, and the on-off valve 18 may be opened when the engine speed is higher than the set speed (3600-4000 rpm).

When the negative pressure in the second air intake duct 17 is below the threshold and the on-off valve 18*a* is closed, only the low temperature air inhaled through the first air intake duct 16 is supplied to the engine. When the negative pressure in the second air intake duct 17 is equal to or higher than the threshold and the on-off valve 18*a* is opened, both the low temperature air inhaled through the first air intake duct 16 and the high temperature air inhaled through the second air intake duct 17 are supplied to the engine.

The first air intake duct 16 and the second air intake duct 17 are disposed such that the center axis of the second air intake duct 17 at an end portion on the side of the second air intake opening 12 intersects with the center axis of the first air intake duct 16 at an end portion on the side of the first air intake opening 11. In other words, the center axis of the second air intake duct 17 intersects with the center axis of the first air intake duct 16 in the air cleaner box 14, and the streamline of the air inhaled through the first air intake duct 16 coincides or is joined with the streamline of the air inhaled through the second air intake duct 17. In this embodiment, the first air intake duct 16 is disposed on a wall surface of the air cleaner box 14 in the direction of arrow A and the second air intake duct 17 is disposed on a wall surface of the air cleaner box 14 in the direction of arrow C, such that the center axis of the first air intake duct 16 at the end portion on the side of the first air intake opening 11 intersects with the center axis of the second air intake duct 17 at the end portion on the side of the second air intake opening 12 generally perpendicularly in the same plane.

The cross-section area of the first air intake duct 16 (not including the air intake inlet 16*a* in this embodiment) is smaller than the cross-section area of the second air intake duct 17, because of the restriction etc. on the layout in the narrow or small engine compartment 2. Further, the first air intake duct 16 is longer than the second air intake duct 17, and the first air intake duct 16 extends to the front portion in the engine compartment where the air intake inlet 16*a* is located. Incidentally, the cross section area of the air intake inlet 16*a* may be greater than that of other portion of the first air intake duct 16, and may be greater than that of the second air intake duct 16. On the other hand, the second air intake duct 17 is set much shorter than the first air intake duct 16, and is connected to a wall surface of the air cleaner box 14, that is different from the wall surface to which the first air intake duct 16 is connected. Therefore, the second air intake duct 17 is not likely to be interfered by other members, such as the first air intake duct 16, and the cross-section area of the second air intake duct 17 can be set large. Accordingly, the pressure loss of air inhaled into the air cleaner box 14 through the second air intake duct 17 is much smaller than the pressure loss of air inhaled into the air cleaner box 14 through the first air intake duct 16. In this embodiment, pressure loss of the first air intake duct 16 and pressure loss of the second air intake duct 17 are set such that the flow volume of air inhaled into the air cleaner box 14 through the second air intake duct 17 is about five to ten times of the flow volume of air inhaled into the air cleaner box 14 through the first air intake duct 16.

In addition, the distance from the center C1 of the first air intake opening 11 to the center C2 of the second air intake opening 12 is set smaller than the distance from the center C1 of the first air intake opening 11 to the center C3 of the communication opening 13 and the distance from the center C2 of the second air intake opening 12 to the center C3 of the communication opening 13.

Further, the second air intake opening 12 is formed in the wall surface of the air cleaner box 14 that faces the communication opening 13. In other words, the second air intake opening 12 is formed in the wall surface of the air cleaner box 14 in the direction of arrow C, and the communication opening 13 is formed in the wall surface of the air cleaner box 14 in the direction of arrow D, which is opposite to the direction of arrow C.

Furthermore, the communication opening 13 is formed at a position closer to the wall surface of the air cleaner box 14 in which the first air intake opening 11 is formed than to the wall surface of the air cleaner box 14 that faces the first air intake opening 11. In other words, the communication opening 13 is formed in the wall surface of the air cleaner box 14 in the direction of arrow D, at a position close to the wall surface in the direction of arrow A, in which the first air intake opening 11 is formed. Incidentally, the second air intake opening 12 may be formed in the wall surface of the air cleaner box 14 in the direction of arrow C, at a position close to the wall surface in the direction of arrow A, in which the first air intake opening 11 is formed.

Next, functions of the embodiment will be described hereinafter.

When the engine operates at a low-speed low-load region, the on-off valve 18a is in a closed state as shown in FIG. 2B. Thus, air is inhaled into the air cleaner box 14 only through the first air intake duct 16. The air that passes though the first air intake duct 16 and is inhaled into the air cleaner box 14 in the direction of arrow B through the first air intake opening 11 changes the flow direction by about 90 degrees and flows toward the communication opening 13 in the direction of arrow D. Then, the air filtered by the filter element 15 flows out from the communication opening 13 and is supplied to the engine through the intake pipe 19.

On the other hand, when the engine operates at a high-speed high-load region, the negative pressure actuator 18b opens the on-off valve 18a, as shown in FIG. 3B. In the state in which the on-off valve 18a is opened, air is inhaled into the air cleaner box 14 through both of the first air intake duct 16 and the second air intake duct 17. In this time, the air that passes through the second air intake duct 17 and enters the air cleaner box 14 through the second air intake opening 12 flows to the opposing wall surface in which the communication opening 13 is formed. However, because the communication opening 13 is positioned on the side close to the inner wall surface in which the first air intake opening 11 is formed, the air entering the air cleaner box 14 from the second air intake opening 12 slightly changes its flow direction to the direction of arrow A, which is the side of the inner wall surface in which the first air intake opening 11 is formed, and passes near the first air intake opening 11. Accordingly, the air that passes through the first air intake duct 16 and enters the air cleaner box 14 from the first air intake opening 11 is drawn by the flow of air that passes through the second air intake duct 17 and enters the air cleaner box 14 from the second air intake opening 12. Thus, the airflow from the first air intake opening 11 is facilitated, and the flow rate and flow volume increase.

As described above, according to the first embodiment, when the engine operates at a high-speed high-load region and the on-off valve 18a is opened, a sufficient amount of air is inhaled through the second air intake opening 12 and the airflow from the first air intake opening 11 into the air cleaner box 14 is facilitated by the flow of the air inhaled from the second air intake opening 12 to the communication opening 13. Accordingly, even if the engine operates at a high-speed high-load region, a sufficient amount of air is inhaled from the second air intake opening 12 and a greater amount of low temperature air is inhaled from the first air intake opening 11, as compared with the conventional system. Thus, good engine performance can be obtained, when the engine operates at a high-speed high-load region.

Further, according to the first embodiment, the distance from the center of the first air intake opening 11 to the center of the second air intake opening 12 is set smaller than the distance from the center C1 of the first air intake opening 11 to the center C3 of the communication opening 13 and the distance from the center C2 of the second air intake opening 12 to the center C3 of the communication opening 13. Therefore, in the air cleaner box 14, the airflow from the second air intake opening 12 to the communication opening 13 passes near the first air intake opening 11. Thus, air is drawn from the first air intake opening 11 into the air cleaner box 14 by the airflow from the second air intake opening 12 to the communication opening 13. Accordingly, the inhale or suction of air from the first air intake opening 11 into the air cleaner box 14 is facilitated more effectively by the flow of the air inhaled from the second air intake opening 12 to the communication opening 13, and good engine performance can be obtained, when the engine operates at a high-speed high-load region.

Further, in the first embodiment, the first air intake duct 16 and the second air intake duct 17 are disposed such that the center axis of the first air intake duct 16 at an end portion on the side of the first air intake opening 11 is generally orthogonal to the center axis of the second air intake duct 17 at an end portion on the side of the second air intake opening 12. Thus, the first air intake opening 11 and the second air intake opening 12 may be formed respectively in the inner wall surfaces of the air cleaner box 14 that are adjacent to each other. Therefore, the opening area or size of the second air intake opening 12 is set to a desirable size without any limitation or restriction on layout. Accordingly, when the engine operates at a high-speed high-load region, a sufficient amount of air is inhaled from the second air intake opening 12, and good engine performance is obtained.

In addition, in the first embodiment, because the second air intake opening 12 and the communication opening 13 are formed respectively in the wall surfaces mutually facing in the air cleaner box 14, the air enters the air cleaner box 14 from the second air intake opening 12 does not greatly change the flow direction and is inhaled into the communication opening 13. Accordingly, pressure loss of the air inhaled into the communication opening 13 from the second air intake opening 12 is prevented from occurring, and sufficient amount of air is inhaled from the second air intake opening. Thus, good engine performance can be achieved when the engine operates at a high-speed high-load region.

Furthermore, in the first embodiment, because the communication opening 13 is formed at a position closer to the wall surface of the air cleaner box 14 in which the first air intake opening is formed than to the wall surface of the air cleaner box 14 facing the first air intake opening 11, the air inhaled into the air cleaner box 14 from the second air intake opening 12 flows harder or faster on the side of wall surface of the air cleaner box 14 in which the first air intake opening 14 is formed than on the side of wall surface of the air cleaner box 14 facing the first air intake opening 11. Accordingly, because the air is securely drawn into the air cleaner box 14 from the first air intake opening 11 and its flow is facilitated, good engine performance can be achieved when the engine operates at a high-speed high-load region.

Incidentally, the second air intake opening 12, rather than or in addition to the communication opening 13, may be formed at a position closer to the wall surface of the air cleaner box 14 in which the first air intake opening 11 is formed than to the wall surface of the air cleaner box 14 that faces the first air intake opening 11. In this case as well, the functions and advantages as described above can be obtained.

FIG. 5 through FIG. 7D show an intake system 20 for a vehicle internal combustion engine according to a second embodiment of the present invention.

The second embodiment is different from the first embodiment in the respect that the shape of a second air intake opening and second air intake duct in the second embodiment is different from the shape of the second air intake opening 12 and second air intake duct 17 in the first embodiment. Therefore, the portions or components in FIG. 5 through FIG. 7D that are the same as or correspond to those in the intake system 10 for the vehicle internal combustion engine according to the first embodiment are explained using the same reference numerals shown in FIG. 1 to FIG. 3C. The portions different from those in the first embodiment are explained in detail below.

Figure 5:
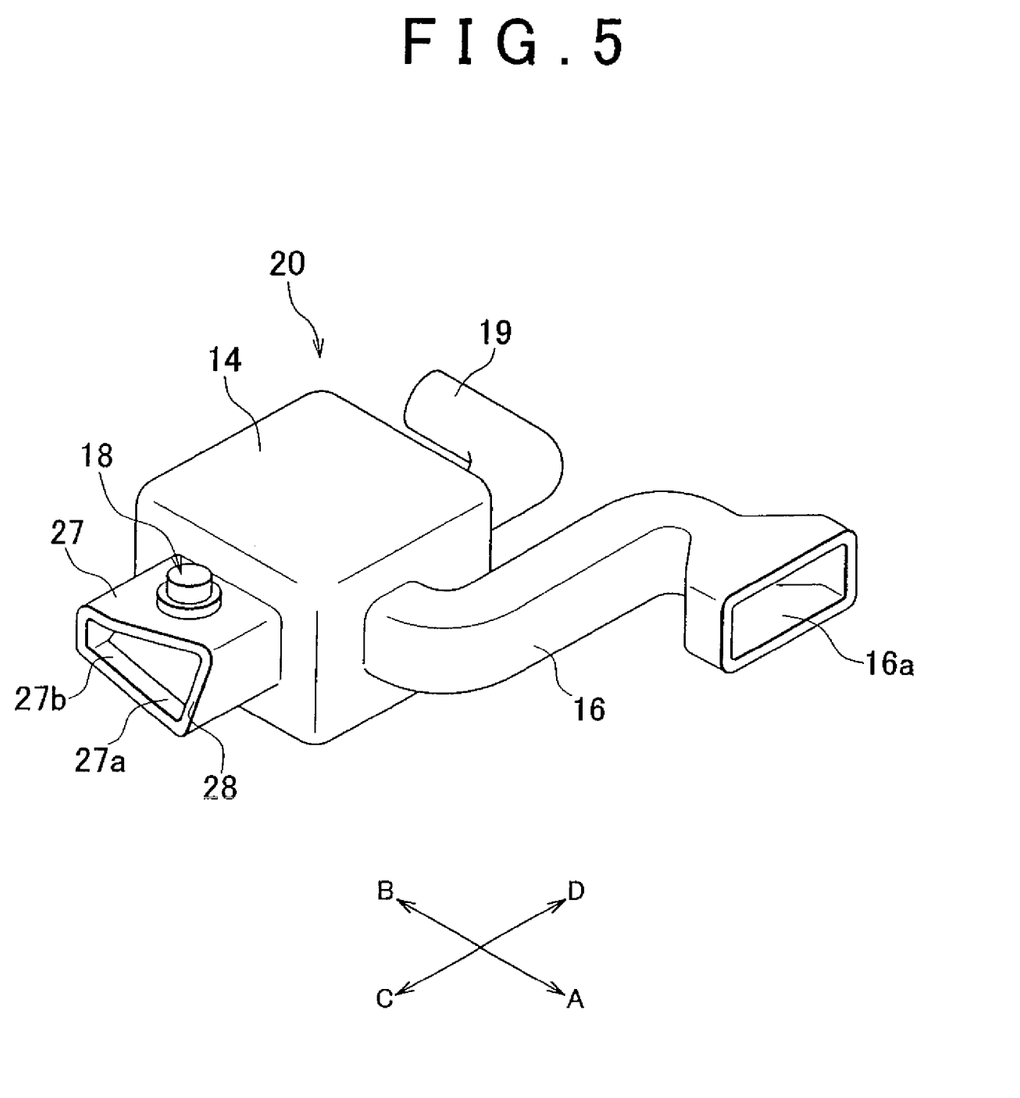
FIG. 5 is a perspective view illustrating a schematic construction of an intake system for a vehicle internal combustion engine according to the second embodiment of the present invention.
Figure 6A:
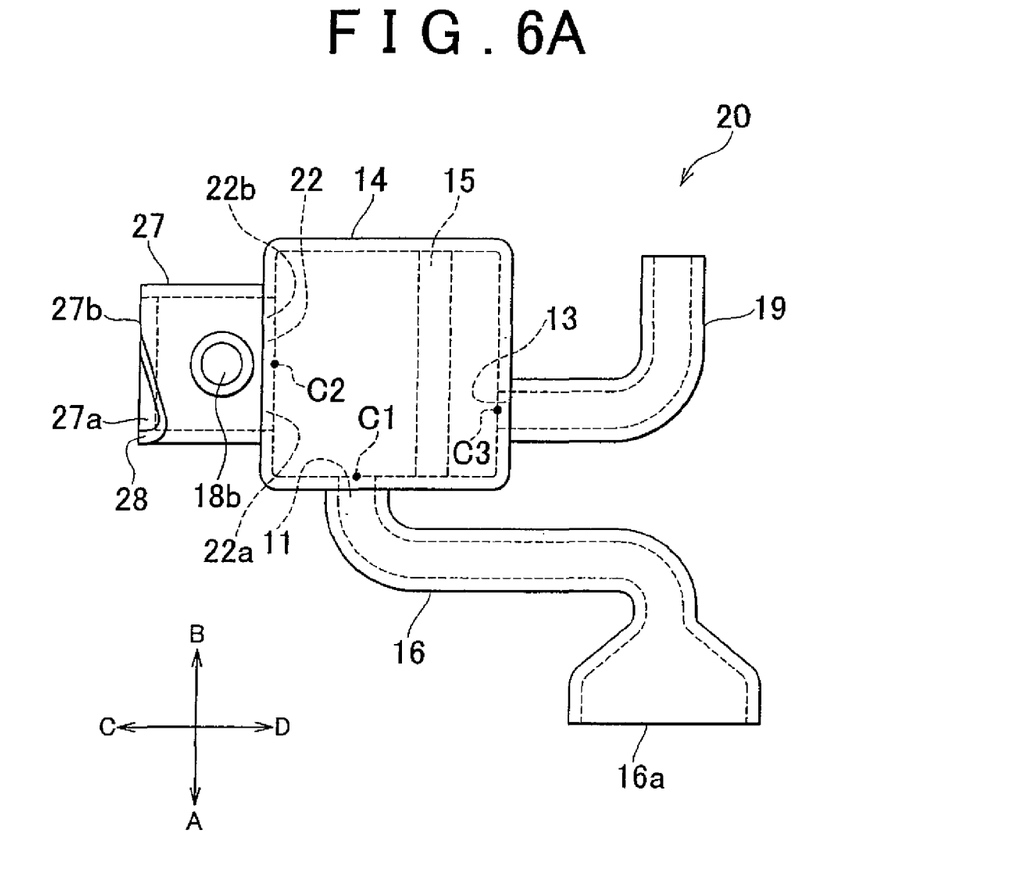
FIGS. 6A and 6B are a top view and a side elevation, respectively, of the intake system for the vehicle internal combustion engine according to the second embodiment of the present invention.
Figure 6B:
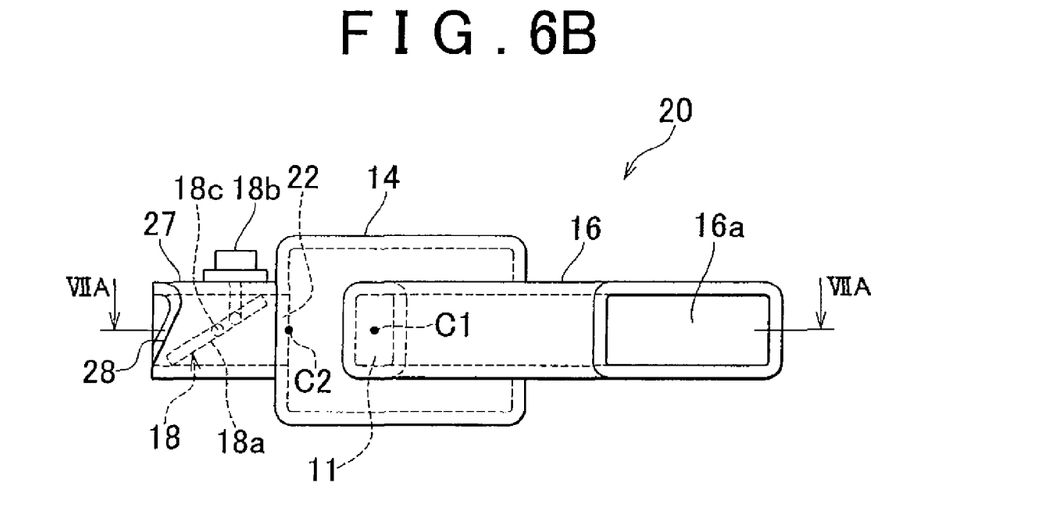
Figure 7A:
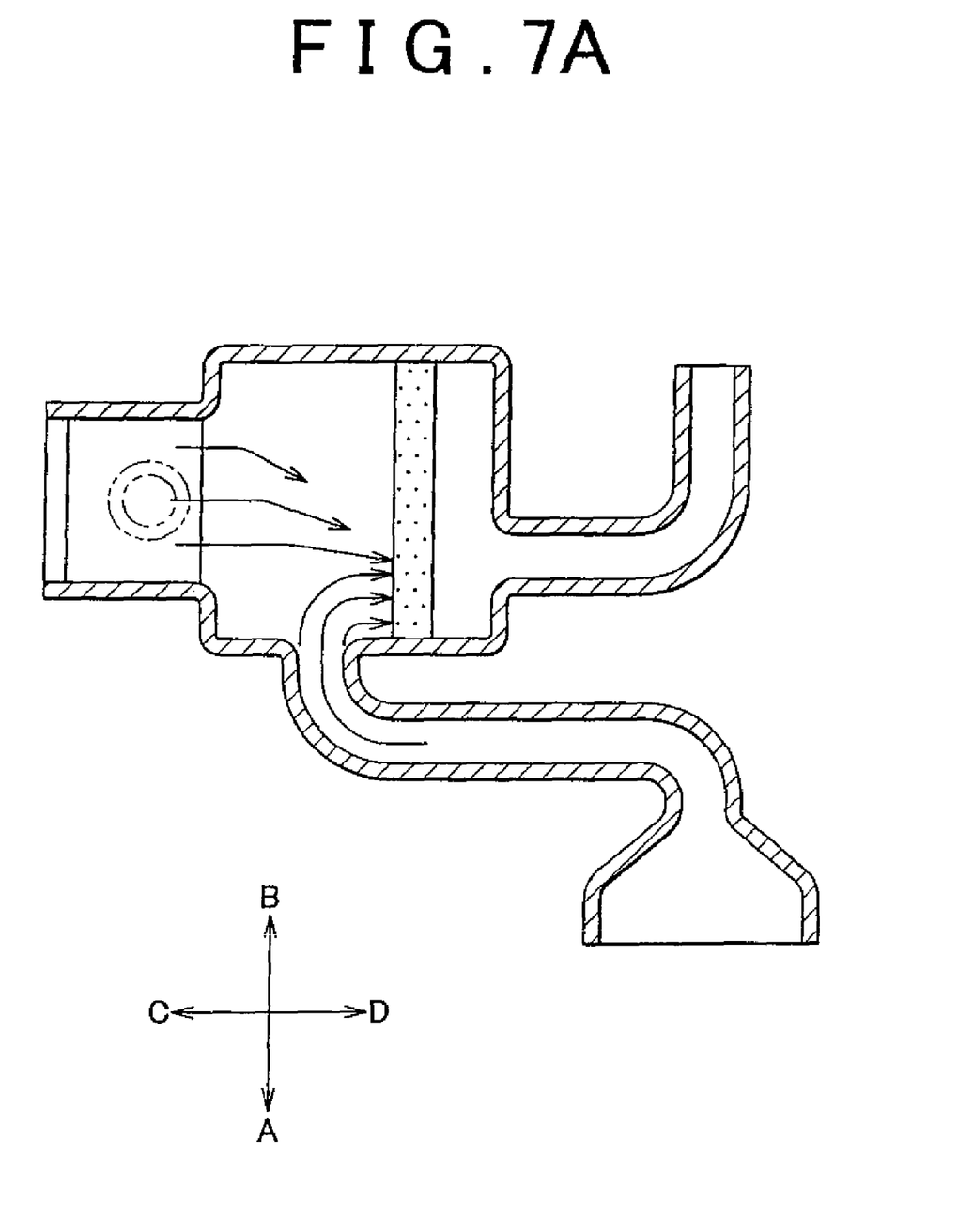
FIG. 7A is a cross section taken along the arrows VIIA-VIIA of FIG. 6B, illustrating an internal construction of the intake system for the vehicle internal combustion engine according to the second embodiment of the present invention.
Figure 7B:
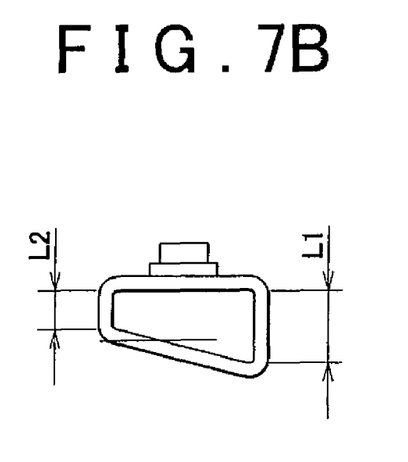
FIG. 7B is a side elevation showing a shape of an air intake inlet of the second air intake duct according to the second embodiment.

In the intake system 20 for the internal combustion engine of the second embodiment as shown in FIG. 5, the second air intake opening 22 has a wide width portion 22a and a narrow width portion 22b (see FIG. 6A). The wide width portion 22a and the narrow width portion 22b have opening widths different from each other. The distance from the wide width portion 22a to the first air intake opening 11 is shorter than the distance from the narrow width portion 22b to the first air intake opening 11, i.e., the wide width portion 22a is located closer to the first air intake opening 11 than the narrow width portion 22b is. In other words, as shown in FIG. 7D, the width L3 of the wide width portion 22a is set greater than the width L4 of the narrow width portion 22b. Thus, the closer the position is to the first air intake opening 11, the greater the opening area of the second air intake opening 22 is. Accordingly, the closer the position is to the first air intake opening 11, the larger the flow rate and the flow volume of the air flowing through the second air intake opening 22 are. In the second embodiment, as shown in FIG. 7B, the shape of the cross section area of the inner wall of the second air intake duct 27 is the same as the shape of the second air intake opening 22. Thus, the second air intake duct 27 has a wide width portion 27a and a narrow width portion 27b as the second air intake opening 22 does. The widths L1 and L2 of the cross section of the second air intake duct 27 shown in FIG. 7B respectively correspond to the widths L3 and L4 of the second air intake opening 22.

Figure 7C:
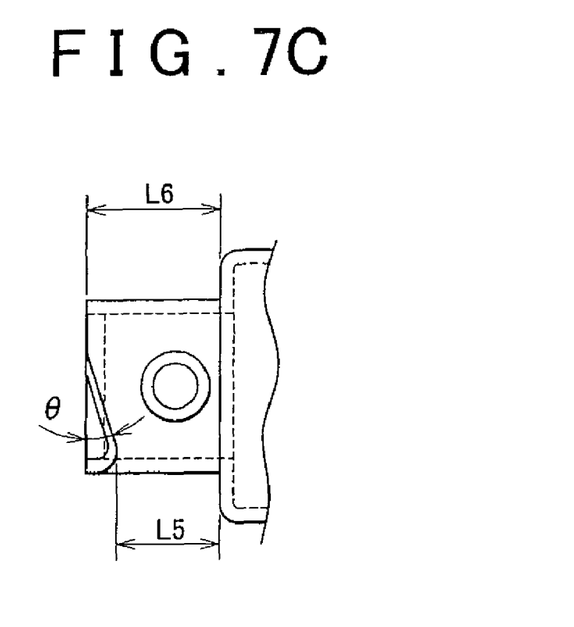
FIG. 7C is a top view showing a shape of the second air intake duct.
Figure 7D:
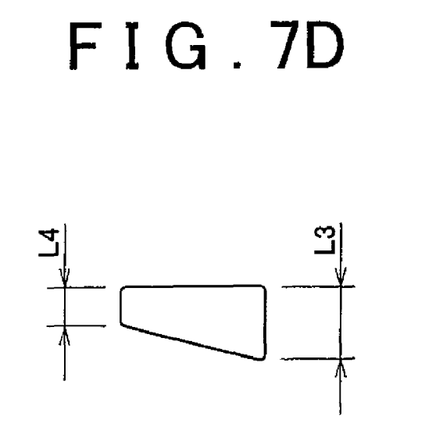
FIG. 7D is a view illustrating the shape of the second air intake opening.

Further, as shown in FIG. 7C, the length L5 of the sidewall of the second air intake duct 27 from the open end 28 to the second air intake opening 22 on the side near the first air intake opening 11 is shorter than the length L6 of the sidewall of the second air intake duct 27 from the open end 28 to the second air intake opening 22 on the side apart from the first air intake opening 11. In other words, the closer the position is to the first air intake opening 11, the shorter the distance from the second air intake opening 22 to the open end 28 of the second air intake duct 27 is. Thus, the open end 28 of the upper surface of the second air intake duct 27 is inclined from the plane parallel to the second air intake opening 22 toward the side of the center of the first air intake opening 11 at the angle θ.

As described above, according to the second embodiment, because the second air intake opening 22 has the wide width portion 22a and the narrow width portion 22b, and the wide width portion 22a is located closer to the first air intake opening 11 than the narrow width portion 22 is, as shown in FIG. 7A, the flow rate and the flow volume of the air passing through the wide width portion 22a of the second air intake opening 22 are higher than the flow rate and the flow volume of the air passing through the narrow width portion 22b. Accordingly, air is further securely drawn into the interior of the air cleaner box 14 from the first air intake opening 11, and the airflow from the first air intake opening is facilitated. Thus, good engine performance can be achieved, when the engine operates at a high-speed high-road region.

Further, according to the second embodiment, because the length L5 of the sidewall of the second air intake duct 27 from the open end 28 to the second air intake opening 22 on the side near the first air intake opening 11 is shorter than the length L6 of the sidewall of the second air intake duct 27 from the open end 28 to the second air intake opening 22 on the side apart from the first air intake opening 11, the pressure loss in the second air intake duct 27 on the side near the first air intake opening 11 is smaller than that on the side apart from the first air intake opening 11. Therefore, the flow rate and the flow volume of the air flowing in the second air intake duct 27 on the side near the first air intake opening 11 are higher than those on the side apart from the first air intake opening 11. Accordingly, air is securely drawn into the interior of the air cleaner box 14 from the first air intake opening 11, and the airflow from the first air intake opening 11 is facilitated. Thus, good engine performance can be achieved, when the engine operates at a high-speed high-road region.

While some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention.

For example, while the shape of the air cleaner box has a rectangular parallelepiped shape in the above-described embodiments, it may have a various shape, such as a circular cylinder shape or an elliptic cylinder shape. The second air intake duct may be connected to the air cleaner box to be inclined with respect to the wall surface of the air cleaner box. For example, if the filter element is disposed horizontally and the communication opening is formed in the lower portion of the wall surface of the air cleaner box, the mounting angle of the second air intake duct may be determined such that the air inhaled into the air cleaner box from the second air intake duct flows toward the communication opening formed in the lower portion of the wall surface of the air cleaner box. In this case, the second air intake opening is formed above the filter element and the communication opening is formed below the filter element. When the center axis of the second air intake duct is not horizontal, but is inclined, the first air intake duct and the second air intake duct may be disposed such that the center axis of the second air intake duct at an end portion on the side of the second air intake opening intersects with the center axis of the first air intake duct at an end portion on the side of the first air intake opening at a point in the air cleaner box.

As described above, the present invention provides functions and effects that good engine performance is achieved when the engine operates at a high-speed and high-load region. Thus, the present invention may have a utility in various intake systems for the internal combustion engine provided with multiple air intake ducts.

The invention claimed is:

1. An intake system for a vehicle internal combustion engine, comprising:
   an air cleaner box that has a first air intake opening, a second air intake opening and a communication opening that communicates with an intake port of the vehicle internal combustion engine;
   a first air intake duct that has an air intake inlet and is connected to the air cleaner box such that air is inhaled from the air intake inlet into the air cleaner box through the first air intake opening;
   a second air intake duct that is connected to the air cleaner box such that air is inhaled into the air cleaner box through the second air intake opening, wherein the air intake inlet is farther apart from the air cleaner box than the second air intake duct is; and
   an on-off valve that is provided in the second air intake duct such that air is inhaled into the air cleaner box through the first air intake opening when the on-off valve is closed, and air is inhaled into the air cleaner box through both of the first air intake opening and the second air intake opening when the on-off valve is opened,
   wherein the cross section area of the second air intake duct is greater than the cross section area of the first air intake duct, and
   the first air intake duct and the second air intake duct are disposed such that a center axis of the second air intake duct at an end portion on a side of the second air intake opening intersects with a center axis of the first air intake duct at an end portion on a side of the first air intake opening.

2. The intake system according to claim 1, wherein the distance from the center of the first air intake opening to the center of the second air intake opening is smaller than the distance from the center of the first air intake opening to the center of the communication opening, and the distance from the center of the second air intake opening to the center of the communication opening.

3. The intake system according to claim 1, wherein the first air intake duct and the second air intake duct are disposed such that the center axis of the second air intake duct at the end portion on the side of the second air intake opening is substantially orthogonal to the center axis of the first air intake duct at the end portion on the side of the first air intake opening.

4. The intake system according to claim 3, wherein the second air intake opening is formed in a wall surface of the air cleaner box that faces the communication opening.

5. The intake system according to claim 4, wherein the communication opening is formed closer to a wall surface of the air cleaner box in which the first air intake opening is formed than to a wall surface of the air cleaner box facing the first air intake opening.

6. The intake system according to claim 4, wherein the second air intake opening is formed closer to a wall surface of the air cleaner box in which the first air intake opening is formed than to a wall surface of the air cleaner box facing the first air intake opening.

7. The intake system according to claim 5, wherein the second air intake opening is formed closer to the wall surface of the air cleaner box in which the first air intake opening is formed than to the wall surface of the air cleaner box facing the first air intake opening.

8. The intake system according to claim 5, wherein the second air intake opening includes a wide width portion and a narrow width portion whose opening widths are different from each other, and the wide width portion is closer to the first air intake opening than the narrow width portion is.

9. The intake system according to claim 8, wherein a length of a sidewall of the second air intake duct from an open end thereof to the second air intake opening on a side near the first air intake opening is shorter than a length of the sidewall of the second air intake duct from the open end to the second air intake opening on a side apart from the first air intake opening.

10. The intake system according to claim 1, further comprising a filter element that is disposed substantially vertically between a wall surface of the air cleaner box in which the communication opening is formed and a wall surface of the air cleaner box in which the second air intake opening is formed.

11. The intake system according to claim 1, further comprising a filter element that is disposed substantially horizontally, wherein the second air intake duct is connect to the air cleaner box to be inclined with respect to a wall surface of the air cleaner box such that air inhaled from the second air intake duct flows toward the communication opening formed below the filter element.

12. The intake system according to claim 1, wherein the center axis of the second air intake duct at the end portion on the side of the second air intake opening intersects with the center axis of the first air intake duct at the end portion on the side of the first air intake opening in the air cleaner box.

13. The intake system according to claim 1, wherein the second air intake opening includes a wide width portion and a narrow width portion whose opening widths are different from each other, and the wide width portion is closer to the first air intake opening than the narrow width portion is.

* * * * *